Patented Apr. 14, 1953

2,635,037

UNITED STATES PATENT OFFICE 2,635,037

PREPARATION OF ZIRCONIUM TETRAFLUORIDE

Harley A. Wilhelm, Ames, Iowa, and Kenneth A. Walsh, Los Alamos, N. Mex., assignors to the United States of America as represented by the United States Atomic Energy Commission No Drawing. Application November 26, 1951, Serial No. 258,278

8 Claims. (Cl. 23—88)

This invention deals with a process of making zirconium tetrafluoride and in particular with a process in which the reaction is carried out in aqueous solution.

Zirconium tetrafluoride is widely used for the production of zirconium metal either by electrolysis or by reduction with alkaline earth metals. For the production of a pure zirconium metal, it is desirable to use a zirconium tetrafluoride of high purity.

Zirconium usually occurs together with hafnium, and in some processes used for separating the hafnium from the zirconium, the zirconium is obtained in the form of zirconium oxychloride aqueous solutions which upon evaporation yield the zirconium oxychloride octahydrate

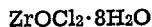

$$ZrOCl_2 \cdot 8H_2O$$

A comprehensive study has been made in order to develop a satisfactory process for the conversion of zirconium oxychloride octahydrate to the fluoride. This has been done, for instance, by first dehydrating the oxychloride at a temperature of from 200° to 300° C. and then fluorinating the dehydrated product with gaseous hydrofluoric acid at between 200° and 400° C. This method, however, was found to have certain disadvantages. During the dehydration step of the oxychloride part of it was converted to the zirconium oxide which was not as easily convertible to the fluoride as is the chloride; consequently, the yield of zirconium tetrafluoride was not satisfactory. Furthermore, the zirconium tetrafluoride obtained by that process, being contaminated with zirconium oxide, had to be purified by sublimation. Zirconium tetrafluoride obtained by sublimation is very hard and rather difficult to grind.

It is an object of this invention to provide a process for the preparation of zirconium tetrafluoride by which the above-listed disadvantages are eliminated.

It is another object of this invention to provide a process for the preparation of zirconium tetrafluoride by which a noncaking anhydrous product of high purity is obtained.

It is another object of this invention to provide a process for the preparation of zirconium tetrafluoride by which a final product is obtained which is practically free of chlorine and therefore noncorrosive.

It is still another object of this invention to provide a process for the preparation of zirconium tetrafluoride in which grinding of a hard product is not required.

It is still another object of this invention to provide a process for the preparation of zirconium tetrafluoride in which no sublimation step is necessary whereby usually impurities are incorporated.

It is still another object of this invention to provide a process for the preparation of zirconium tetrafluoride which yields a high output and thus is very economical.

It is finally also an object of this invention to produce a zirconium tetrafluoride which when reduced yields a zirconium metal of an especially high ductility.

These and other objects are accomplished by mixing zirconium oxychloride with an aqueous solution of hydrofluoric acid whereby zirconium fluoride crystals precipitate and heat is developed, allowing the solution to cool to room temperature, separating the precipitate from the mother liquor, and drying, and/or removing bonded water from the precipitate at a temperature up to 575° C.

When the zirconium oxychloride, which may be added in the form of an aqueous solution or as the crystals, was mixed with the aqueous hydrofluoric acid, the solution first remained clear; however, very soon precipitation set in. The solutions or reagents were preferably mixed at room temperature. The reaction is exothermic, and the temperature usually rose to about 60° C.

An excess of hydrofluoric acid is not necessary, and stoichiometric quantities were therefore preferred. The concentration of the hydrofluoric acid may vary within wide ranges; however, a concentration of from 30–55% was preferred. It has been found that a longer contact of the reagents in the aqueous mixture, prior to the separation of the precipitate, is advantageous if the zirconium tetrafluoride is to be used for the production of zirconium metal because the longer a fluorination time is chosen, the softer a zirconium metal will be obtained.

The reaction mixture was then allowed to cool to room temperature whereupon the bulk of the liquid was removed, e. g., by decantation. The greatest part of the remaining mother liquor was then eliminated by methods known to those skilled in the art, for instance by filtration or centrifuging.

The separated precipitate was then dried; this was preferably carried out in platinum-lined copper trays at a temperature of approximately 100° C. The temperature of about 110° C. was found to be especially advantageous. The dry zirconium fluoride obtained in some instances amounted to a yield of as high as 98%. The final product in all instances contained less than 0.1% chlorine. This zirconium fluoride was of great softness and much softer than the zirconium tetrafluoride obtained by sublimation as described in the introduction of this specification. The zirconium fluoride of this process could be powdered, for instance, with a mortar and pestle which is a great advantage because impurities are not likely to be incorporated into the product by this step.

Thereafter, the dried product was subjected to another heat treatment step for the purpose of converting this "intermediate" fluoride to $ZrF_4$, the final product desired. This was done at temperatures up to 575° C. in an atmosphere of hydrogen fluoride gas. Magnesium-lined monel metal trays were found especially suitable for this step because magnesium, which might be taken up and retained by the zirconium tetrafluoride as contamination, may be easily removed later from zirconium metal by volatilization. A furnace temperature of from 400° to 500° C. was found satisfactory for the second heat treatment step. In one instance 3500 g. of the intermediate zirconium fluoride were heated at about 500° C. in an atmosphere of hydrogen fluoride within five hours; 93.3% were converted to a granular noncaking powdery $ZrF_4$, and about 98% of this powder passed a 100 mesh screen.

This zirconium tetrafluoride obtained by the above-described process, when employed for the zirconium production by reduction with calcium using iodine or sulfur as a booster (as described in the above-mentioned copending application) yielded a rather brittle metal. However, it was found that when the heat treatment of the intermediate fluoride was carried out in two stages, one stage consisting of heating for eight hours at about 200° C. furnace temperature (which corresponded to 175° to 225° C. for the fluoride) and then for another eight hours at about 550° C. furnace temperature (500° to 575° C. for the fluoride), in 60% of the experiments carried out the zirconium metal obtained had a satisfactory ductility. When the second state was extended to a period of time of sixteen hours, a ductile zirconium metal was obtained in 95% of the experiments made, and when the second heating stage of the second heating step was applied for twenty-four hours, all of the zirconium metal obtained was ductile.

In the following, an example is given of the process of this invention without the intention to limit the invention to the details given therein.

*Example*

Eighteen hundred grams of aqueous hydrofluoric acid (48%) were added to 4142 g. of $ZrOCl_2.8H_2O$ (the oxychloride yielded 31.35% $ZrO_2$ upon ignition) in a Fluorothene beaker. A precipitate formed which was separated from 3020 g. of mother liquor by decantation. The wet precipitate consisting mainly of zirconium fluoride was dried in a platinum-line copper tray at a temperature (of the precipitate) of 100°±50° C. By this, 1220 g. of liquid were evaporated and 1700 g. of a dry solid "intermediate" zirconium fluoride were obtained. The product had a chlorine content of 0.09%.

This intermediate product was then placed in monel trays at a furnace temperature of about 500° C.; the temperature of the fluoride under these conditions ranged from 450° to 550° C. Heating was carried out for five hours in an atmosphere of dry hydrofluoric acid whereby $ZrF_4$ was formed. The analysis of the final product showed the following composition:

| | |
|---|---|
| Fe | 10–20 p. p. m. |
| Ti | 10 or less p. p. m. |
| $N_2$ | 10–15 p. p. m. |
| Ni | <20 p. p. m. |
| Si | 20–35 p. p. m. |
| C | 10–50 p. p. m. |
| $H_2O$ content | 0.04–0.07% |

It will be understood that this invention is not to be limited to the details given herein but that it may be modified within the scope of the appended claims.

What is claimed is:

1. A process of preparing zirconium tetrafluoride, comprising mixing zirconium oxychloride with an aqueous solution of hydrofluoric acid whereby an intermediate zirconium fluoride precipitates and heat is developed, allowing the reaction mixture to cool to room temperature, separating the zirconium fluoride precipitate from mother liquor, and drying and heat-treating the precipitate at a temperature up to 575° C.

2. The process of claim 1 wherein mixing is carried out at room temperature.

3. The process of claim 1 wherein the hydrofluoric acid solution has a concentration of from 30–55%.

4. The process of claim 1 wherein the drying is carried out at about 100° C. and heat treatment at a temperature from 100° to 575° C.

5. The process of claim 4 wherein heat treatment is carried out in an atmosphere of hydrogen fluoride gas.

6. The process of claim 5 wherein the heat treatment is carried out at 175° to 575° C. for at least eight hours.

7. The process of claim 6 wherein the heat treatment is carried out in two steps first at a temperature of from 175° to 225° C. and then at from 500° to 575° C.

8. The process of claim 7 wherein the temperature of from 500° to 575° C. is maintained for twenty-four hours.

HARLEY A. WILHELM.
KENNETH A. WALSH.

References Cited in the file of this patent

J. W. Mellor's "A Comprehensive Treatise on Inorganic and Theoretical Chemistry," vol. 7, pages 137 and 138 (1927 ed.), Longmans, Green and Co., London.